United States Patent Office 3,459,720
Patented Aug. 5, 1969

3,459,720
POLYMERIZATION OF N-VINYL LACTAMS IN PRESENCE OF AZO CATALYST AND HYDROPEROXIDE COMPOUND
Frederick Grosser, Midland Park, N.J., and Eugene V. Hort, Easton, Pa., assignors to GAF Corporation, a corporation of Delaware
No Drawing. Continuation-in-part of application Ser. No. 273,299, Apr. 16, 1963. This application May 16, 1966, Ser. No. 558,168
Int. Cl. C08f *1/78, 1/60, 33/04*
U.S. Cl. 260—88.3      17 Claims

ABSTRACT OF THE DISCLOSURE

Control of the Fikentscher K values of poly N-vinyl lactams to within the range of about 20 to 40 is achieved by carrying out the polymerization of the monomer e.g. N-vinyl pyrrolidone in a solvent, such as water or lower alcohol, in the presence of an azo compound, such as azobisbutyronitrile, as catalyst, and including a predetermined amount of a hydroperoxide such as hydrogen peroxide, in the system during the entire polmerization.

---

This is a continuation-in-part of our copending application Ser. No. 273,299, filed Apr. 16, 1963, now abandoned.

The present invention relates, in general, to the polymerization of N-vinyl lactams and, in particularly, to an improved process for the polymerization of N-vinyl butyrolactam or N-vinyl pyrrolidone.

Polymerized N-vinyl lactams and particularly polyvinyl pyrrolidone have achieved wide commercial acceptance because, in part, of their special properties of low toxicity and solubility in both organic solvents and water, making them admirably adapted for use as stripping agents in processes for the dyeing of textiles; dispersants in suspension polymerizations; thickening agents for pharmaceuticals, veterinarian and cosmetic preparations; constituents of adhesive and sizing compositions; binders for special lithographic and printing processes and as a modifier or replacement for gum arabic; gelatin or polyvinyl alcohol. In addition, perhaps the most widely known and most successful use of polyvinyl pyrrolidone has been its use as a blood plasma colloid for Periston-type solutions for intravenous use in shock therapy.

The types of polymers of N-vinyl pyrrolidone which enjoy the widest range of commercial value are those polymers of medium molecular weight as evidenced by a Fikentscher K value of about 30, say in the range of about 20 to 40 K; however, the art has not developed methods for reliably achieving such molecular weights without undue supervision of the reaction during polymerization. At present, there are practiced at least two commercial methods for the polymerization of N-vinyl pyrrolidone to polyvinyl pyrrolidone. One method uses peroxide catalysts, but the products obtained are inferior in terms of color stability, odor, and viscosity stability of the aqueous solution. Also, such processes are usually too slow. The other method is based on the use of azo compounds, such as azobisisobutyronitrile as catalysts for the polymerization of N-vinyl pyrrolidone to polyvinyl pyrrolidone. Such catalysts are effective even in organic solvents such as alcohols where peroxide catalysts are ineffective. While azo-catalysts yield products of much superior qualities, the products generally have very high molecular weights—too high for many purposes—unless special supervision is given to each batch of reaction mixture. Thus it ordinarily will be required to supervise and constantly test the polymerization batch and when a suitable molecular weight is achieved, stop the reaction by the addition of a chain-stopping or chain-transfer agent. Further, no completely satisfactory chain transfer agent has yet been found since the use of known materials has other attendant disadvantages.

It has now been discovered that all of the benefits and advantages of a method for polymerizing N-vinyl lactams such as N-vinyl pyrrolidone in the presence of an azo compound as a catalyst for the system can be obtained while simultaneously controlling the molecular weight of the product in the desired range by conducting the polymerization in the presence of an appropriate amount of a hydroperoxide. In the reaction, the hydroperoxides appear to function as moderating agents for the azo-catalyzed polymerization. That peroxides should function as such is indeed surprising and unexpected since the art is familiar with them in their customary role as catalysts. The compounds which have been found effective in carrying out the method of the invention include hydroperoxides such as hydrogen hydroperoxide (hydrogen peroxide), cumene hydroperoxide, ditertiary butyl hydroperoxide and the like.

The N-vinyl lactams which are subject to polymerization in accordance with the procedures of this invention include N-vinyl pyrrolidone, N-vinyl caprolactam, N-vinyl-hexahydrophthalimide, N-vinyl piperidone and the like with N-vinyl pyrrolidone being preferred.

The azo compounds which find immediate and practical utility in the method of the invention are azo compounds which have an acyclic azo, —N=N—, group, bonded to different, i.e., distinct, i.e., separate, carbons which are non-aromatic, i.e. aliphatic or cycloaliphatic, i.e., aliphatic in character, at least one of which is tertiary. The more active and therefore more preferred catalysts within this class of azo compounds are those in which the tertiary carbon has attached to it through carbon a radical in which the three remaining valences of the latter carbon are satisfied by at least one element of atomic number 7–8 (oxygen and/or nitrogen). Symmetrical azo compounds having two tertiary carbons attached to the azo nitrogens and having as the negative group attached to the tertiary carbons, the nitrile, carbonamide, or carbalkoxy group have increased activity at lower temperatures and, therefore, are preferred. The negative radical in general is neutral with respect to acidity, and of these neutral radicals the nitrile is preferred since the azonitriles are readily obtained and have high activity.

Examples of azo compounds which may be used in the method of this invention and which have one tertiary carbon are alpha-(carbamylazo)-isobutyronitrile,
alpha-(carbamylazo)-methyleneanthonitrile,
alpha-(carbamylazo)-alpha-phenylpropionitrile,
alpha-(carbamylazo)-alpha-cyclopropylpropionitrile,
alpha-(carbamylazo)-alpha,alpha-dicyclohexylacetonitrile,
alpha-(carbamylazo)-isobutyramide,
alpha-(carbamylazo)-alpha,gamma-dimethylvaleramide, and
hexyl alpha-(carbamylazo)-alpha,gamma-dimethyl-valerate.

These compounds may be prepared by the procedure described by Thiele and Stange, Ann. 283, 33–77 (1894).

Azo compounds which are symmetrical and accordingly have two tertiary aliphatic or alicyclic carbons, i.e., tertiary carbons aliphatic in character, attached to the azo nitrogens are usually active 10–20° C. lower than those having only one tertiary group. Examples of these preferred compounds include:

alpha,alpha-azodiisobutyronitrile,
alpha,alpha'-azobis(alpha,gamma-dimethylvaleronitrile),
alpha,alpha'-azobis(alpha-methylbutyronitrile),
alpha,alpha'-azobis(alpha-ethylbutyronitrile),
alpha,alpha'-azobis(alpha-methyleneanthonitrile),
alpha,alpha'-azobis(alpha-phenylpropionitrile),
alpha,alpha'-azobis-(alpha-cyclopropylpropionitrile),
alpha,alpha'-azobis(alpha-cyclohexylpropionitrile),
alpha,alpha'-azobis(alpha-cycloheptylpropionitrile),
alpha,alpha'-azobis(alpha-isopropyl-beta-methyl-butyronitrile),
alpha,alpha'-azobis(alpha,gamma-dimethylcapronitrile),
alpha,alpha'-azobis-(alpha-n-butyl-capronitrile),
alpha,alpha'-azobis(alpha-isobutyl-gamma-methyl-valeronitrile),
alpha,alpha'-azobis(alpha-methyl-gamma-carboxybutyronitrile) and its salts, e.g.,
disodium gamma,gamma'-azobis-(gamma-cyanovalerate),
1,1'-azodicyclohexanecarbonitrile,
1,1'-azodicycloheptanecarbonitrile,
1,1'-azobis(3-methyl-cyclopentanecarbonitrile),
1,1'-azobis(2,4-dimethylcyclohexane-carbonitrile),
1,1'-azodicamphanecarbonitrile (the azonitrile derived from camphor), and the polymeric azonitrile derived from 2,15-cetanedione by the method described in U.S. Patent 2,556,876, and the corresponding amides and esters of the above in which the nitrile group or groups are replaced by amide and/or ester e.g., to give alpha,alpha'-azodiisobutyramide,
alpha,alpha'-azobis(alpha,gamma-dimethylvaleramide),
alpha,alpha'-azobis(alpha-cyclopropylpropionamide),
1,1'-azodicyclohexanecarbonamide,
N,N'-alpha,alpha'-azodiisobutyrodiethylamide,
dimethyl 1,1'-azodicyclohexanecarboxylate, and
dimethyl, diethyl, and
dihexyl alpha,alpha'- azodiisobutyrate.

Preferably lower alkyl esters, e.g., of the 1–6 carbon alcohols, are used as catalysts in view of the ease and economy in preparing such esters.

The azonitriles may be prepared by the process described by Thiele and Heuser, Ann. 290, 1–43 (1896); Hartmann, Rec. trav. chim. 46, 150–153 (1927); Chem. weekblad., vol. 23, pages 77–78, January 1926; and Dox, J. Am. Chem. Soc. 47, 1471–1477 (1925). A particularly effective, preferred, and desirable method is that set forth in U.S. Patent No. 2,469,358, wherein the azine isolated from the reaction of the ketone and hydrazine is reacted with excess hydrogen cyanide containing less than 50% and preferably less than 10% water to give the hydrazonitrile. The hydrazonitrile is readily oxidized by chlorine in an aqueous medium to give the azonitrile. The azonitrile can be converted to amides and esters, e.g., by formation of the iminoether hydrochloride by reaction with dry hydrogen chloride and an anhydrous alcohol followed by reaction with ammonia or the appropriate hydrogen-bearing amine, or with water. Thiele and Heuser (cited above) show the preparation of azo esters and amides. Because of the ease of preparation from available ketones, the nitriles of alpha,alpha'-azodialkanoic acids and the lower (1 to 6 carbon) alkyl esters and the amides of such acids are particularly preferred.

In general, the more useful azo compounds have aliphatic or cycloaliphatic radicals of 4–11 carbons on each of the azo nitrogens and usually have carbon and hydrogen or carbon, hydrogen, and oxygen as the elements in the radical excepting the negative substituent on the tertiary carbon. The particularly preferred azo compounds are the alpha,alpha'-azobis (aliphatic nitriles) and preferably the alpha,alpha'-azobis (alkanenitriles) of 4–8 carbons on each of the azo nitrogens.

The temperature at which the polymerization reaction can be effected can be varied over a wide range, that is, from about 25° C. and lower to about 150° C. and higher. The polymerization reaction can, if desired, be carried out at subatmospheric, atmospheric and superatmospheric pressures although autogenous pressures are preferred. The reaction can also be carried out in the presence of solvents of the type ROH where R is hydrogen or alkyl of 1 to about 5 carbon atoms, that is solvents such as water and lower aliphatic alcohols. Representative lower aliphatic alcohols useful for this purpose include methanol, ethanol, 2-propanol and the like.

The proportions of azo compound and chain transfer agent employed in carrying out the invention are not necessarily a critical feature of the invention and can be varied over a wide range. In general, the only effect of increasing the azo catalyst concentration will be to increase the rate of polymerization with little, if any, effect on the molecular weight. On the other hand, however, an increase in the hydroperoxide agent will both decrease the rate of reaction and decrease the molecular weight of the polymer. Both effects have been found to be directly related in a predictable manner to the concentration of the hydroperoxide, all other conditions remaining constant. Satisfactory polymerizations have been obtained which produce polymers of N-vinyl pyrrolidone having a Fikentscher K value of about 30.0 when the azo catalyst concentration is from about 0.05 to about 1.0 weight percent of azo compound based on the weight of N-vinyl pyrrolidone charged to the reaction, and the hydroperoxide is in the range from about 0.5 to 5.0 weight percent based on the weight of N-vinyl pyrrolidone charged to the reaction. Preferably, the proportions of azo catalyst and hydroperoxide in the process of the invention which provides most beneficial results with respect to the desired molecular weight, will vary from 0.2 to 0.5 part of diazo catalyst per part of hydroperoxide agent. Since the azo catalyst and hydroperoxide are advantageously both added at the start of the polymerization reaction to avoid the need for supervision and testing during the reaction, the exact amount of hydroperoxide, within the above-mentioned ranges, to be employed in any given set of circumstances should be predetermined by a preliminary run or runs, to settle on the exact amount which will give the desired Fikentscher K value of about 30.

As used herein the term "Fikentscher K value" is intended to indicate the relative molecular weights of the polymers produced in the examples which follow. The Fikentscher K value is an art-recognized and accepted indication of relative molecular weights of polymers and is described in "Vinyl and Related Polymers" by Schildknecht, John Wiley & Sons, New York 19, N.Y. 1952, at page 676.

Example 1

A 50% solution of N-vinyl pyrrolidone in ethanol catalyzed with 3% of a 35% hydrogen peroxide solution and 3% of a 28% solution of ammonia was heated and maintained at gentle reflux conditions. Subsequently, additions of 0.5% of additional catalyst solution were added every two hours and samples were withdrawn periodically to measure the residual monomer in the reaction mixture. The following data indicate that the rate of polymerization of the reaction mixture is impractically low despite additions of catalyst to the reaction mixture.

| Time, hours: | Residual monomer, percent of original |
|---|---|
| 4 | 43.7 |
| 8 | 38.0 |
| 12 | 34.4 |
| 16 | 31.0 |

The above example illustrates that the polymerization of N-vinyl pyrrolidone in ethanol with a hydrogen peroxide-ammonia catalyst system is unsatisfactory and impractical since only 69% of the monomer is converted to polymer after 16 hours.

Example 2

A 50% solution of N-vinyl pyrrolidone in ethanol and catalyzed with 0.5% of an azoisobutyronitrile is heated. The solution maintains reflux without external heating for some time. When the reaction subsides, heating is restored as necessary. After a period of four hours at reflux, the residual N-vinyl pyrrolidone is 0.4% which indicates that the polymerization rate is not impractically low. However, the Fikentscher K value of the product was 51.0.

The above example illustrates that when an azo catalyst is used alone, without hydroperoxide, the molecular weight of the product may run too high unless special precautions are taken to stop the polymerization.

Example 3

Mixtures comprising 50% solutions of N-vinyl pyrrolidone in ethanol, as a solvent, were charged to a polymerization kettle equipped with a stirrer and reflux condenser and heated. In each mixture different concentrations of azoisobutyronitrile (AIBN) and 35% hydrogen peroxide (HP) compound were employed as reflected in the following Table I:

TABLE I

| Percent AIBN | Percent HP | Hours for completion | Fikentscher K values of polymer |
| --- | --- | --- | --- |
| 0.1 | 1.0 | 13 | 31.7 |
| 0.2 | 1.0 | 10 | 30.9 |
| 0.3 | 1.0 | 8 | 30.1 |
| 0.5 | 1.0 | 4 | 30.1 |
| 0.5 | 2.0 | 7 | 24.7 |
| 0.5 | 3.0 | 13 | 22.0 |
| 0.5 | 0.5 | 3 | 35.7 |

The above data clearly demonstrate that by employing the novel catalyst compositions of the invention it is possible to obtain reasonable reaction rates for the polymerization and let the reaction run to completion while obtaining molecular weights in the polymers so produced having Fikentscher K values in the commercially desired range.

Example 4

In a manner similar to Example 3 additional experiments were conducted to illustrate that the effect of the solvent used in the polymerization reaction is negligible when the catalyst compositions of the invention are employed. The following Table II reflects the Fikentscher K values obtained using azoisobutyronitrile (AIBN) with and without hydrogen peroxide (HP) in various solvents, the most advantageous proportion of HP having been determined in previous runs.

TABLE II

| Solvent | Percent AIBN | Percent HP | Fikentscher K values |
| --- | --- | --- | --- |
| Water | 0.4 | 0 | 93.3 |
| Do | 0.4 | 1.0 | 32.0 |
| Methanol | 0.4 | 0 | 73.1 |
| Do | 0.4 | 1.0 | 31.5 |
| Ethanol | 0.4 | 0 | 51.0 |
| Do | 0.4 | 1.0 | 30.1 |
| 2-propanol | 0.4 | 0 | 42.9 |
| Do | 0.4 | 1.0 | 29.1 |

Example 5

In a manner similar to that set forth in the previous examples a 50 weight percent solution of N-vinyl pyrrolidone in ethanol containing 0.4 weight percent of azoisobutyronitrile and 1.0 weight percent of cumene hydroperoxide gave complete polymerization in less than four hours and the polymerization product had a Fikentscher K value of 32.7.

Example 6

Similarly, other azo catalysts provided similar results in accordance with the teachings of the invention. For example, in conducting a polymerization reaction, in the manner above-described with azobiscyclohexyl cyanide (ACHC) with and without hydrogen peroxide (HP) the results, set forth in Table III, were obtained with a 50 weight percent solution of N-vinyl pyrrolidone in ethanol.

TABLE III

| Percent ACHC | Percent HP (35%) | Fikentscher K value |
| --- | --- | --- |
| 0.4 | 0 | 76.6 |
| 0.4 | 1.0 | 32.0 |

While the invention has been described in its various embodiments and specifically set forth in the examples with respect to certain methods for polymerizing N-vinyl lactams and novel catalyst combinations useful therefor in achieving one or more objects of the invention, it is apparent that the invention is not subject to restriction thereto since obvious modifications thereof will occur to persons skilled in the art. Therefore, it is intended that the invention shall include all such modifications and be interpreted as being applicable thereto insofar as the state of the art permits.

What is claimed is:

1. A method for producing polymers of N-vinyl lactams having a Fikentscher K value in the range of about 20–40 which comprises carrying out the polymerization in a solvent selected from the group consisting of water and lower aliphatic alcohols in the presence of both about 0.05 to 1 percent azo catalyst and about 0.5 to 5.0 percent of a hydroperoxide chain transfer agent during the entire polymerization, said percentages being based on the amount of N-vinyl lactam starting monomer.

2. The method in accordance with claim 1 wherein the N-vinyl lactam is N-vinylpyrrolidone.

3. The method in accordance with claim 1 wherein the N-vinyl lactam is N-vinyl caprolactam.

4. The method in accordance with claim 1 wherein the N-vinyl lactam is N-vinyl piperidone.

5. The method in accordance with claim 1 wherein the N-vinyl lactam is N-vinyl hexahydrophthalimidine.

6. The method in accordance with claim 1 wherein the solvent is water.

7. The method in accordance with claim 1 wherein the solvent is a lower aliphatic alcohol.

8. The method in accordance with claim 7 wherein the lower aliphatic alcohol is methanol.

9. The method in accordance with claim 7 wherein the lower aliphatic alcohol is ethanol.

10. The method in accordance with claim 7 wherein the lower aliphatic alcohol is 2-propanol.

11. The method in accordance with claim 1 wherein the azo compound is azoisobutyronitrile and the hydroperoxide compound is hydrogen peroxide.

12. The method in accordance with claim 1 wherein the azo compound is azoisobutyronitrile and the hyroperoxide compound is cumene hydroperoxide.

13. The method in accordance with claim 1 wherein the azo compound is azobiscyclohexylcyanide and the hydroperoxide compound is hydrogen peroxide.

14. In a method for the polymerization of N-vinyl pyrrolidone in the presence of about 0.05 to 1 percent of an azo catalyst and in a solvent selected from the group consisting of water and lower aliphatic alcohols, the improvement which comprises carrying out the entire polymerization in the presence of a predetermined amount in the range of about 0.5 to 5.0 percent, of a peroxide chain transfer agent selected from the group consisting of hydrogen peroxide and hyroperoxides, to control the molecular weight of the resulting polymer at a Fikentscher K value of about 30.0, said percentages being by weight based on the amount of N-vinyl pyrrolidone.

15. The method in accordance with claim 14 wherein the azo compound is aziosobutyronitrile and the hydroperoxide compound is hydrogen peroxide.

16. The method in accordance with claim 14 wherein the azo compound is azoisobutyronitrile and the hydroperoxide compound is cumene hydroperoxide.

17. The method in accordance with claim 14 wherein the azo compound is azobiscyclohexlycyanide and the hydroperoxide compound is hydrogen peroxide.

References Cited

UNITED STATES PATENTS

| | | |
|---|---|---|
| 2,754,245 | 7/1956 | Hosmer. |
| 2,982,762 | 5/1961 | Volks et al. |
| 3,129,210 | 4/1964 | Grosser et al. |
| 3,141,010 | 7/1964 | Ehmann et al. _____ 260—89.1 |
| 3,133,904 | 5/1964 | Tousignant et al. |
| 3,414,547 | 12/1968 | Thompson et al. ____ 260—78.5 |

FOREIGN PATENTS 1,056,831   5/1959   Germany.

JAMES A. SEIDLECK, Primary Examiner

WILLIAM F. HAMROCK, Assistant Examiner

U.S. Cl. X.R.

260—89, 239